(12) United States Patent
Rhee et al.

(10) Patent No.: US 10,797,334 B2
(45) Date of Patent: Oct. 6, 2020

(54) ION CONDUCTIVE POLYMER ELECTROLYTE MEMBRANE HAVING ION CHANNEL SIZE CONTROLLED ACCORDING TO PHASE SEPARATION IMPROVEMENT EFFECT OF POLAR SOLVENT DURING CASTING OF ION CONDUCTIVE POLYMER ELECTROLYTE MEMBRANE, AND PREPARATION METHOD THEREFOR

(71) Applicant: SOGANG UNIVERSITY RESEARCH FOUNDATION, Seoul (KR)

(72) Inventors: Heewoo Rhee, Seoul (KR); Sangwoo Kim, Seoul (KR); Taeyung Youn, Gyeonggi-do (TW); Seungyoung Choi, Gyeongsangbuk-do (KR)

(73) Assignee: SOGANG UNIVERSITY RESEARCH FOUNDATION, SOGANG UNIVERSITY, Seoul (KR)

( * ) Notice: Subject to any disclaimer, the term of this patent is extended or adjusted under 35 U.S.C. 154(b) by 0 days.

(21) Appl. No.: 16/091,573

(22) PCT Filed: Jan. 31, 2017

(86) PCT No.: PCT/KR2017/001000
§ 371 (c)(1),
(2) Date: Oct. 5, 2018

(87) PCT Pub. No.: WO2017/175959
PCT Pub. Date: Oct. 12, 2017

(65) Prior Publication Data
US 2019/0123373 A1 Apr. 25, 2019

(30) Foreign Application Priority Data
Apr. 7, 2016 (KR) .................. 10-2016-0042906

(51) Int. Cl.
*H01M 8/10* (2016.01)
*H01M 8/1081* (2016.01)
(Continued)

(52) U.S. Cl.
CPC ............ *H01M 8/1081* (2013.01); *C08J 3/11* (2013.01); *C08J 5/2237* (2013.01); *C08J 5/2256* (2013.01);
(Continued)

(58) Field of Classification Search
CPC ............ H01M 8/1081; H01M 8/1018; H01M 8/1025; H01M 8/1032; H01M 8/1039;
(Continued)

(56) References Cited

U.S. PATENT DOCUMENTS

2012/0028167 A1* 2/2012 Wang ................ C08G 73/1042
429/494

FOREIGN PATENT DOCUMENTS

JP 2007-186608 A 7/2007
JP 2012-243451 A 12/2012
(Continued)

OTHER PUBLICATIONS

International search report issued in PCT/KR2017/001000 dated Jul. 10, 2017.
(Continued)

*Primary Examiner* — Raymond Alejandro
(74) *Attorney, Agent, or Firm* — McClure, Qualey & Rodack, LLP

(57) ABSTRACT

Provided are an proton conducting polymer electrolyte membrane and a manufacturing method thereof which control the proton conducting nanochannel size and proton
(Continued)

conductivity by phase separation improvement of a polar aprotic solvent in casting the proton conducting polymer electrolyte membrane.

6 Claims, 2 Drawing Sheets

(51) Int. Cl.

| | | |
|---|---|---|
| H01M 8/1039 | (2016.01) | |
| H01M 8/1088 | (2016.01) | |
| H01M 8/1069 | (2016.01) | |
| H01M 8/1018 | (2016.01) | |
| H01M 8/1032 | (2016.01) | |
| C08J 5/22 | (2006.01) | |
| C08J 3/11 | (2006.01) | |
| H01M 8/1025 | (2016.01) | |

(52) U.S. Cl.
CPC ....... *H01M 8/1018* (2013.01); *H01M 8/1025* (2013.01); *H01M 8/1032* (2013.01); *H01M 8/1039* (2013.01); *H01M 8/1069* (2013.01); *H01M 8/1088* (2013.01); *C08J 2327/12* (2013.01); *C08J 2371/10* (2013.01); *H01M 2008/1095* (2013.01); *H01M 2300/0082* (2013.01)

(58) Field of Classification Search
CPC .............. H01M 8/1069; H01M 8/1088; H01M 2008/1095; H01M 2300/0082; C08J 3/11; C08J 5/2237; C08J 5/2256; C08J 2327/12; C08J 2371/10
See application file for complete search history.

(56) References Cited

FOREIGN PATENT DOCUMENTS

| | | |
|---|---|---|
| JP | 5621180 B2 | 11/2014 |
| KR | 10-0833056 | 5/2008 |
| KR | 10-20080083805 A | 9/2008 |
| KR | 10-0963747 | 6/2010 |
| KR | 10-2010-0028625 A | 12/2010 |

OTHER PUBLICATIONS

Kim et al. "Characterization and Properties of P(VdF-HFP)-Based Fibrous Polymer Electrolyte Membrane Prepared by Electrospinning" Journal of the Electrochemical Society, 152 (2) A295-A300 (2005).

Costamagna et al. "Nafion® 115/zirconium phosphate composite membranes for operation of PEMFCs above 100° C." Electrochimica Acta 47 (200) 1023-1033.

\* cited by examiner

ION CONDUCTIVE POLYMER ELECTROLYTE MEMBRANE HAVING ION CHANNEL SIZE CONTROLLED ACCORDING TO PHASE SEPARATION IMPROVEMENT EFFECT OF POLAR SOLVENT DURING CASTING OF ION CONDUCTIVE POLYMER ELECTROLYTE MEMBRANE, AND PREPARATION METHOD THEREFOR

BACKGROUND OF THE DISCLOSURE

Field of the Disclosure

The present disclosure relates to a method of controlling or expanding the size of proton conducting nanochannels of a proton conducting polymer electrolyte membrane by mixing a polar organic solvent and a hydrophilic solvent at a specific ratio.

Description of the Background Art

NAFION™, a fluorinated polymer electrolyte developed by DuPont, is representative among those materials which have been used as proton exchange membrane. NAFION™ fluorinated polymer electrolyte has a structure in which the main chain of fluorinated PTFE is bonded with the hydrophilic side chains at a sulfonic acid group terminal and forms large and clear proton conducting nanochannels due to its obvious phase separation between hydrophilic phases and hydrophobic phases. Therefore, it shows an advantageous effect of high cationic conductivity, 0.1 S/cm, by dissociation of sulfonic acid groups under humidity conditions.

A non-fluorinated polymer electrolyte membrane, e. g., sPEEK and sPAES, has narrow proton conducting nanochannel because it has a lower degree of phase separation, than that of a fluorinated polymer electrolyte membrane, e. g., NAFIONυ, between its main chain (aromaticity, hydrophobic) and side chains (sulfonic acid group, hydrophilic). Because proton conductivity occurs through proton conducting nanochannel proton conducting nanochannels, a non-fluorinated polymer electrolyte membrane, which has a smaller proton conducting nanochannel, has lower proton conductivity than that of a fluorinated polymer electrolyte membrane, which accounts for a problem.

Electrolyte membranes which conduct anions in an alkaline environment, apart from proton conducting polymer electrolyte membranes, are classified into fluorinated and non-fluorinated, as the polymer electrolyte membrane abovementioned does, according to the type of their main chain while their side chains have an amine-based cation group, e.g., quaternary ammonium, benzyl trimethyl ammonium, methyl imidazolium, alkyl ammonium, resonance stabilized guanidinium and the like.

The proton conductivity of an proton conducting polymer electrolyte membrane is determined by its ion exchange capacity, IEC, and the size of its proton conducting nanochannel. The proton conductivity increases as IEC gets higher. However, a membrane with high IEC dissolves in water because its water swelling increases rapidly due to the high IEC. From this point of view, it is possible to easily control the proton conductivity of an proton conducting polymer electrolyte membrane without the problem of water swelling if the size of its proton conducting nanochannel can be controlled without controlling its IEC.

SUMMARY OF THE DISCLOSURE

To resolve the problem, the present disclosure provides the proton conducting polymer membrane whose proton conductivity is controlled without degradation of its physical properties by controlling the proton conducting nanochannel size of an proton conducting polymer electrolyte without controlling the IEC of the proton conducting polymer electrolyte itself or without adding hydrophilic inorganic particles.

An aspect of the present disclosure provides the method of controlling the proton conducting nanochannel size of the proton conducting polymer electrolyte membrane by mixing a solution including a proton conducting non-fluorinated polymer electrolyte or a proton conducting fluorinated polymer electrolyte and an organic solvent with a hydrophilic solvent at a predetermined ratio.

Another aspect of the present disclosure provides the method of controlling the proton conducting nanochannel size of the proton conducting polymer electrolyte membrane by mixing a solution for which the proton conducting non-fluorinated or fluorinated polymer electrolyte is mixed with a first hydrophilic solvent, with a second hydrophilic solvent which has high compatibility with a hydrophilic functional group of the non-fluorinated or fluorinated polymer electrolyte at a predetermined ratio.

Another aspect of the present disclosure provides the proton conducting polymer electrolyte membrane manufactured by the method, wherein the proton conducting nanochannel size of the proton conducting polymer electrolyte membrane is expanded compared with that of the proton conducting polymer electrolyte membrane which does not include the hydrophilic solvent.

The present disclosure provides an advantageous effect of controlling or expanding the proton conducting nanochannel size of the proton conducting polymer electrolyte membrane by adding the hydrophilic solvent to the solution including the organic solvent and the proton conducting polymer electrolyte or by adding a polar hydrophilic solvent which is highly compatible with the hydrophilic functional group to the solvent for which the polymer is mixed with the hydrophilic solvent at a specific ratio.

BRIEF DESCRIPTION OF THE DRAWINGS

Since the present disclosure may have various modifications, the present disclosure is now described below in detail in connection with accompanying drawings.

DETAILED DESCRIPTION OF THE DISCLOSURE

Figure 1:
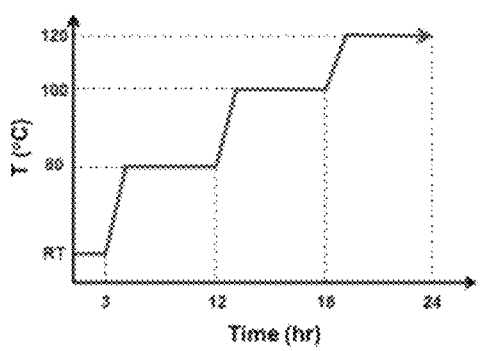
FIG. 1 is a graphical example of time and heating temperature in a stage of drying.

Embodiments of the present disclosure will be described in more detail with reference to the accompanying drawings.

The present disclosure relates to the method of controlling the proton conducting nanochannel size of the proton conducting polymer electrolyte membrane.

The method of controlling the proton conducting nanochannel size of the proton conducting polymer electrolyte membrane according to the present disclosure includes a stage of mixing the polar solvent with the solution including the organic solvent and the polymer electrolyte at a specific ratio. More particularly, the method of controlling the proton conducting nanochannel size of the proton conducting polymer electrolyte membrane includes a stage of mixing the solution including the proton conducting non-fluorinated or fluorinated polymer electrolyte and the organic solvent with the hydrophilic solvent at a predetermined ratio. In addition, the method of controlling the proton conducting nanochannel size of the proton conducting polymer electrolyte membrane include a stage of mixing by adding the polar hydrophilic solvent which is highly compatible with the hydrophilic functional group to the solvent for which the polymer is mixed with the hydrophilic solvent at a specific ratio. More particularly, the method of controlling the proton conducting nanochannel size of the proton conducting polymer electrolyte membrane includes a stage of mixing by adding the second hydrophilic solvent which is highly compatible with the hydrophilic functional group of the non-fluorinated or fluorinated polymer electrolyte to the solution for which the proton conducting non-fluorinated or fluorinated polymer electrolyte is mixed with the first hydrophilic solvent at a predetermined ratio, wherein the first hydrophilic solvent can or cannot be identical to the second hydrophilic solvent.

The stage of mixing is mixing the proton conducting polymer electrolyte solution including the organic solvent and the non-fluorinated polymer electrolyte or the fluorinated polymer electrolyte with the polar solvent.

The proton conducting polymer electrolyte membrane can be applied as an proton conducting membranes for fuel cells without restriction.

The non-fluorinated polymer electrolyte or the fluorinated polymer electrolyte has a structure to which at least one which is a hydrophilic cation exchange functional group among a sulfonic acid group ($SO_3H$), an amine group ($NH_3$) and a phosphoric acid group ($-PO_3H_2$) is bonded or has a structure having an amine-based hydrophilic anion exchange functional group, e.g., quaternary ammonium, benzyl trimethyl ammonium, methyl imidazolium, alkyl ammonium, resonance stabilized guanidinium and the like.

The non-fluorinated polymer electrolyte membrane is classified, according to its manufacturing method, into cross-linked hydrocarbons, grafted polymer and polymer blends and, according to how the hydrophilic functional group is bonded, into a structure for which the functional group is bonded directly to the main chain, a structure in which the side chains which include the functional group are grafted and a block polymer, which includes a hydrophobic block and a hydrophilic block.

The main chain of the non-fluorinated polymer electrolyte membrane includes hydrophobic aromatic hydrocarbons while the functional group includes a cation source and an anion source and assumes hydrophilicity.

The non-fluorinated polymer electrolyte can be a non-fluorinated polymer of any of polyarylene-based polymers, polyetherketone and polyetheretherketone or have a structure for which a hydrophilic ion exchange functional group which is at least one of the hydrophilic cation exchange functional group and the amine-based hydrophilic anion exchange functional group of the sulfonic acid group ($SO_3H$), the amine group ($NH_3$) and the phosphoric acid group ($-PO_3H_2$) is bonded to the non-fluorinated polymer.

The non-fluorinated polymer electrolyte can be a proton conducting proton conducting polymer membrane of sulfonated polyetheretherketone, sPEEK, sulfonated polyetherketone, sPEK, sulfonated polyethersulfone, sPES, or sulfonated polyarylethersulfone, sPAES, or an anproton conducting polymer membrane of Neosepta, AR204SZRA, IPA, Selemion AMV or FAS.

The fluorinated polymer electrolyte is divided, according to the main chain structure of the polymer electrolyte, which includes the hydrophobic fluorinated main chain and the hydrophilic side chains, into totally fluorinated and partially fluorinated, according to the type of the functional group of the side chains, into sulfonic acid group, phosphoric acid group, amine group and the like and, according to the length of the side chains, into long side chain and short side chain.

The fluorinated polymer electrolyte can have a structure for which the fluorinated polymer which is at least one selected from the fluorinated group of polytetrafluoroethylene, PTFE, polyvinylfluoride, PVF, polyvinylidine fluoride, PVDF, and polyethylenetetrafluoroethylene, ETFE, is bonded to the hydrophilic ionic exchange functional group which is at least one of the hydrophilic cation exchange functional group of the sulfonic acid group ($SO_3H$), the amine group ($NH_3$), and the phosphoric acid group ($-PO_3H_2$) and a structure having the amine-based hydrophilic anion exchange functional group, e. g., quaternary ammonium, benzyl trimethyl ammonium, methyl imidazolium, alkyl ammonium, resonance stabilized guanidinium and the like.

The fluorinated polymer electrolyte can be NAFION™ AQUIVION®, FLEMION®, GORE™, ACIPLEX™, RAIPORE™ R-1030, Aciplex A-192™ or MORGANE®-ADP.

The organic solvent is a polar aprotic solvent for dissolving polymers while the hydrophilic solvent can be a polar protic solvent which has higher polarity compared with the organic solvent.

The polar aprotic solvent for dissolving polymers can be at least one selected among the group of N,N-dimethylacetamide, DMAc, N-methyl pyrrolidone, NMP, dimethyl sulfoxide, DMSO, and N,N-dimethylformamide, DMF.

The hydrophilic solvent has large dipole moments and it is desirable to use for it the polar protic solvent, which can be hydrogen-bonded to the channel. The hydrophilic solvent can be at least one selected from the group of, representatively, t-butanol, n-propanol, ethanol, methanol, ammonia, acetic acid and water.

For the method 1 through 100 wt %, with reference to the organic solvent, of the hydrophilic solvent can be mixed. 1 to 30 wt %, desirably 1 to 20 wt %, or, more desirably, 1 to 10 wt % of the non-fluorinated or fluorinated polymer electrolyte can be dissolved in the polar solvent.

According to the method, proton conductivity of the polymer electrolyte membrane for fuel cells can be increased by controlling the proton conducting nanochannel size of the polymer electrolyte membrane.

Another aspect of the present disclosure provides a method of manufacturing the polymer electrolyte membrane whose proton conductivity is increased.

The method of manufacturing the polymer electrolyte membrane includes:

a stage of mixing the solution which includes the proton conducting non-fluorinated or fluorinated polymer electrolyte and the organic solvent with the hydrophilic solvent at a predetermined ratio; and the stage of drying the mixed solution by coating the solution onto a matrix.

In addition, the method of manufacturing the polymer electrolyte membrane includes:

a stage of mixing by adding the second hydrophilic solvent which is highly compatible with the hydrophilic functional group of the non-fluorinated or fluorinated polymer electrolyte to the solution of the proton conducting non-fluorinated or fluorinated polymer electrolyte and the first hydrophilic solvent; and the stage of drying of the mixed solution by coating the solution onto a matrix.

The first hydrophilic solvent and the second hydrophilic solvent can or cannot be identical to each other.

The proton conducting nanochannel size can be controlled or expanded by using the method. More specifically, the proton conducting nanochannel size of the proton conducting polymer electrolyte membrane according to the present disclosure is expanded compared with that of the polymer electrolyte membrane which does not include the hydrophilic solvent. The proton conducting nanochannel size of the proton conducting polymer electrolyte membrane can be increased up to 150% of the polymer electrolyte membrane which does not include the hydrophilic solvent, or the polymer electrolyte membrane which does not assume the polar solvent effect.

What thereinbefore described in detail can be referred to for the stage of mixing.

Known methods of membrane fabrication can be used without restriction for the stage of coating.

The stage of drying is for evaporating the hydrophilic solvent and the organic solvent. Also, known methods can be used without restriction for the stage of drying.

FIG. 1 is a graphical example of time and heating temperature in the stage of drying. In the stage of drying, referring to FIG. 1, when the hydrophilic solvent is water, the water is in part evaporated at 80° C. for a determined period, then, without interruption, completely evaporated at an increased temperature of 100° C. and the organic solvent can be removed at an further increased temperature of 120° C.

Figure 2:
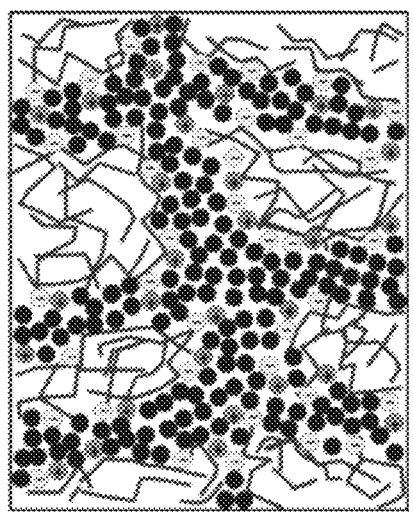
FIG. 2 is a schematic diagram illustrating a structure in which the proton conducting nanochannel size of the polymer electrolyte membrane by adding the hydrophilic solvent.

FIG. 2 is a schematic diagram illustrating a structure in which the proton conducting nanochannel size of the polymer electrolyte membrane by adding the hydrophilic solvent (blue particles). Sulfonated polymer electrolyte forms the proton conducting nanochannels by phase separation between the hydrophobic main chain and the hydrophilic side chains while the non-fluorinated hydrocarbon electrolyte membrane forms the smaller proton conducting nanochannels because it assumes a lower degree of phase separation than that of the fluorinated polymer electrolyte membrane and has lower channel connectivity due to many of its dead-ends, where nanochannels are severed.

Another aspect of the present disclosure provides the proton conducting membrane for fuel cells as manufactured according to the method.

It is possible to control the proton conducting nanochannel size of the polymer electrolyte membrane according to the present disclosure due to its hydrophilic solvent differently from the polymer electrolyte membrane which does not assume the hydrophilic solvent effect.

Since the present disclosure may have various modifications and embodiments, the present disclosure is now described below in detail in connection with specific embodiments. However, it does not intend to limit the present disclosure to specific embodiments and must be acknowledged that the embodiments should include all the modifications, equivalents and substitutes within the technical thoughts and scope of the present disclosure.

Embodiment 1

An sPEEK solution having 5 wt % of sPEEK including DMAc was mixed with water and agitated for a day. Water was included 1 through 100% with reference to the weight of DMAc, respectively.

Upon completing agitation, the solution was casted at 80° C. all through the night. Upon completing casting, the membrane was carefully detached form the petri dish while pouring distilled water into the dish. To remove the residual organic solvent from the inside of the electrolyte membrane, the membrane was boiled in 1 M sulfuric acid solution at 80° C. for 1 hour, then in water at 100° C. for about 1 hour.

Comparative Example 1

This was executed under the same conditions as Embodiment 1 save for adding water.

Experiment 1: Proton Conductivity Measurement

After evaluating the thickness of the polymer electrolyte membrane fabricated in Embodiment 1 and Comparative Example 1, proton conductivity was measured at 80° C. and 100% RH by connecting a 4-probe conductivity cell from Bekktech LLC to AC impedance.

Experiment 2: Small-Angle Scattering

Figure 3:
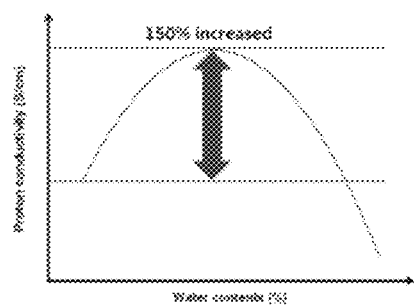
FIG. 3 shows proton conductivity of the proton conducting polymer electrolyte membrane according to the present disclosure has increased compared with the polymer electrolyte membrane which does not have polar solvent effect.

Small-angle scattering curves were plotted by using 4C SAXS2 beams in the Pohang Accelerator Laboratory. FIG. 3 and Table 1 show the proton conductivity measured in Experiment 1 under the conditions of 80° C. and 100% RH.

TABLE 1

| Water/DMAc (%) | Increase of proton conductivity (%) |
|---|---|
| 0 through 100 | 100 to 150 |

As illustrated and listed in FIG. 3 and Table 1, Embodiment 1 showed an increment of proton conductivity of 100 to 150% with reference to Comparative Example 1 when water was added by 0 through 100 wt % with reference to the organic solvent at 80° C.

Figure 4:
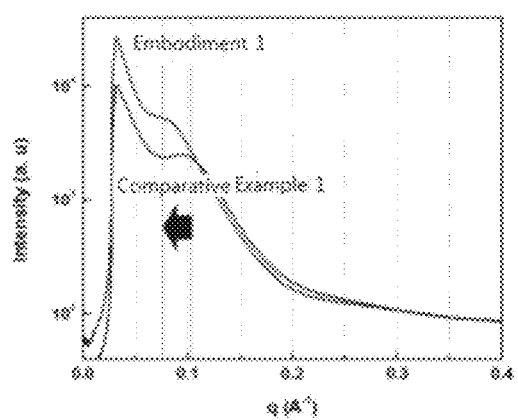
FIG. 4 shows a small-angle scattering curve obtained from Experiment 2.

FIG. 4 shows a small-angle scattering curve obtained from Experiment 2. Table 2 lists the rate of proton conducting nanochannel size increase derived from the date of FIG. 4.

TABLE 2

| Water/DMAc (%) | Increase of proton conducting nanochannel size (%) |
|---|---|
| 0 through 100 | 100 to 150 |

As listed in Table 2, Embodiment 1 (when water was added by 0 through 100 wt % with reference to the organic solvent) shows an increment of proton conducting nanochannel size of 100 to 150% with reference to Comparative Example 1.

The present disclosure has been described so far with reference to embodiments of the present disclosure. A person skilled in the art may acknowledge that the present invention may be achieved into various modifications within the basic features of the present disclosure. Therefore, the embodiments so far disclosed must be considered explicative, not definitive. The scope of the present disclosure is clear in the scope of Claims, not in the description that has been so far stated and all the differences within the scope of the equivalents must be interpreted to be included in the present disclosure.

INDUSTRIAL APPLICABILITY

The present disclosure can be used for the proton conducting polymer electrolyte membrane.

What is claimed is:

1. A method of controlling proton conducting nanochannel size of a polymer electrolyte membrane, comprising:
   a stage of mixing a solution comprising an proton conducting non-fluorinated polymer electrolyte or proton conducting fluorinated polymer electrolyte and an organic solvent with a hydrophilic solvent at a predetermined ratio, wherein the organic solvent is a polar aprotic solvent used for dissolving a polymer and the hydrophilic solvent is a polar protic solvent which has higher polarity compared with the organic solvent; and
   a stage of drying the solution by coating the solution on a matrix,
   wherein:
   if the proton conducting fluorinated polymer electrolyte is used, an amine-based hydrophilic anion exchange functional group or at least one hydrophilic cation exchange functional group among a sulfonic acid group ($SO_3H$), an amine group ($NH_3$) and a phosphoric acid group ($-PO_3H_2$) are bonded to a fluorinated polymer; and
   if the proton conducting non-fluorinated polymer electrolyte is used, the amine-based hydrophilic anion exchange functional group or at least one of the hydrophilic cation exchange functional group among the sulfonic acid group ($SO_3H$), the amine group ($NH_3$) and the phosphoric acid group ($-PO_3H_2$) are bonded to any one of a non-fluorinated polymer among polyarylene-based polymers, polyetherketone and polyetherehterketone.

2. The method of controlling proton conducting nanochannel size of a polymer electrolyte membrane of claim 1, wherein the organic solvent is one selected from the group of N,N-dimethylacetamide, N-methyl pyrrolidone, dimethyl sulfoxide, and N,N-dimethylformamide, while the hydrophilic solvent is at least one selected from the group of t-butanol, n-propanol, ethanol, methanol, ammonia, acetic acid and water.

3. The method of controlling proton conducting nanochannel size of a polymer electrolyte membrane of claim 1, wherein the proton conducting fluorinated polymer which is at least one selected from the fluorinated group of polytetrafluoroethrylene, polyvinylfluoride, polyvinylidine fluoride, and polyethylenetetrafluoroethylene, is bonded to a hydrophilic ionic exchange functional group which is at least one of the hydrophilic proton exchange functional group of the sulfonic acid group ($SO_3H$), the amine group ($NH_3$), and the phosphoric acid group ($-PO_3H_2$) and a structure having the amine-based hydrophilic anion exchange functional group.

4. The method of controlling proton conducting nanochannel size of a polymer electrolyte membrane of claim 1, wherein the proton conducting non-fluorinated polymer electrolyte is a proton conducting polymer membrane of sulfonated polyetheretherketone, sulfonated polyetherketone, sulfonated polyethersulfone, or sulfonated polyarylethersulfone, or an anproton conducting polymer membrane.

5. A method of increasing proton conductivity of a polymer electrolyte membrane for fuel cells by controlling proton conducting nanochannel size of the polymer electrolyte membrane of claim 1.

6. A method of increasing proton conductivity of a polymer electrolyte membrane for fuel cells by controlling proton conducting nanochannel size of the polymer electrolyte membrane of claim 1.

* * * * *